(12) United States Patent
Hiscock (10) Patent No.: US 9,319,098 B2
(45) Date of Patent: Apr. 19, 2016

(54) ENCRYPTING COMMUNICATIONS

(75) Inventor: Paul Dominic Hiscock, Cambridge (GB)

(73) Assignee: Qualcomm Technologies International, Ltd., Cambridge (GB)

( * ) Notice: Subject to any disclaimer, the term of this patent is extended or adjusted under 35 U.S.C. 154(b) by 485 days.

(21) Appl. No.: 13/451,512

(22) Filed: Apr. 19, 2012

(65) Prior Publication Data

US 2012/0269343 A1    Oct. 25, 2012

(30) Foreign Application Priority Data

Apr. 19, 2011  (GB) .................................. 1106609.9
May 6, 2011    (GB) .................................. 1107564.5

(51) Int. Cl.
*H04L 29/06*    (2006.01)
*H04B 1/713*    (2011.01)
*H04L 27/10*    (2006.01)

(52) U.S. Cl.
CPC ................ *H04B 1/713* (2013.01); *H04L 27/10* (2013.01); *H04L 27/103* (2013.01)

(58) Field of Classification Search
CPC .... H04L 63/0428; H04L 27/10; H04L 27/103
USPC ........................................................ 380/255
See application file for complete search history.

(56) References Cited

U.S. PATENT DOCUMENTS

| | | | |
|---|---|---|---|
| 5,359,625 A | 10/1994 | Vander Mey et al. | |
| 5,424,631 A | 6/1995 | Ward | |
| 5,452,291 A | 9/1995 | Eisenhandler et al. | |
| 5,657,022 A | 8/1997 | Van Etten et al. | |
| 5,668,880 A | 9/1997 | Alajajian | |
| 5,748,670 A | 5/1998 | Zastrow | |
| 5,850,390 A | 12/1998 | Ramel | |
| 6,064,695 A | 5/2000 | Raphaeli | |
| 6,304,619 B1 | 10/2001 | Citta et al. | |
| 6,335,946 B1 | 1/2002 | Winnberg | |

(Continued)

FOREIGN PATENT DOCUMENTS

| | | |
|---|---|---|
| CN | 101741414 | 6/2010 |
| CN | 101753497 | 6/2010 |
| CN | 102223332 | 10/2011 |

OTHER PUBLICATIONS

Kowatsch, M., et al., "A Spread-Spectrum Concept Combining Chirp Modulation and Pseudonoise Coding", IEEE Trans. on Comm., 31(10), 10/2983, pp. 1133-1142.

(Continued)

*Primary Examiner* — Brandon Hoffman
*Assistant Examiner* — Thong Truong
(74) *Attorney, Agent, or Firm* — Procopio Cory Hargreaves & Savitch LLP (57) ABSTRACT

A method of securely communicating a data chirp signal from a transmitter to a receiver, the chirp signal comprising at least one symbol, each symbol comprising one or more identical chirps, each chirp encoding a symbol value, the method comprising: negotiating between the transmitter and the receiver encryption parameters of the chirp signal, the encryption parameters defining at least one property of each symbol of the chirp signal; at the transmitter, encrypting the chirp signal as negotiated; at the transmitter, encoding data in the chirp signal via the symbol value of each chirp; and transmitting the encrypted and encoded chirp signal from the transmitter to the receiver.

20 Claims, 6 Drawing Sheets

(56) References Cited

U.S. PATENT DOCUMENTS

| | | |
|---|---|---|
| 6,418,158 B1 | 7/2002 | Vishwanath et al. |
| 6,498,822 B1 | 12/2002 | Tanaka |
| 6,549,562 B1 | 4/2003 | Olaker et al. |
| 6,677,895 B1 | 1/2004 | Holt |
| 7,068,704 B1 | 6/2006 | Orr |
| 7,194,019 B2 | 3/2007 | Dowla et al. |
| 8,031,650 B2 | 10/2011 | Petite et al. |
| 8,121,172 B1 | 2/2012 | Whelan et al. |
| 8,175,134 B1 | 5/2012 | Giallorenzi et al. |
| 8,180,881 B2 | 5/2012 | Seo et al. |
| 8,295,393 B2 | 10/2012 | Watanabe et al. |
| 8,400,349 B1 | 3/2013 | Dubbert et al. |
| 8,406,275 B2 | 3/2013 | Sforza |
| 8,548,025 B2 | 10/2013 | Bettendorff et al. |
| 8,675,710 B2 | 3/2014 | Hiscock |
| 8,718,117 B2 | 5/2014 | Hiscock |
| 9,048,938 B2 | 6/2015 | Hiscock |
| 2001/0055352 A1 | 12/2001 | Bannasch |
| 2002/0009125 A1 | 1/2002 | Shi |
| 2004/0160988 A1 | 8/2004 | Boehlke et al. |
| 2008/0137717 A1 | 6/2008 | Lee |
| 2008/0165833 A1 | 7/2008 | Lee |
| 2008/0231498 A1* | 9/2008 | Menzer et al. ............... 342/134 |
| 2008/0267137 A1 | 10/2008 | Dabak et al. |
| 2008/0310481 A1 | 12/2008 | Schaffner |
| 2009/0116839 A1 | 5/2009 | Kikuchi et al. |
| 2009/0185581 A1* | 7/2009 | Beverly et al. ............... 370/474 |
| 2010/0054348 A1 | 3/2010 | Choi et al. |
| 2010/0150209 A1 | 6/2010 | Gonzalez et al. |
| 2011/0280332 A1 | 11/2011 | Yonge, III |
| 2011/0310765 A1 | 12/2011 | Hui et al. |

OTHER PUBLICATIONS

Search Report issued Aug. 10, 2012 in corresp. GB1107564.5.
Search Report issued in corresponding GB1106609.9.

* cited by examiner

ENCRYPTING COMMUNICATIONS

CROSS-REFERENCE TO RELATED APPLICATIONS

The present application claims priority to GB 1106609.9 filed Apr. 19, 2011 and GB 1107564.5 filed May 6, 2011, the contents of which are incorporated herein by reference in their entirety.

FIELD OF THE INVENTION

The present disclosure relates to chirp communications, and in particular to encrypting chirp communications.

BACKGROUND OF THE INVENTION

The chirp modulation method is a modulation method in which the frequency of a signal (chirp) varies linearly over time in a bandwidth of Fs Hz. A chirp having a positive gradient in the frequency-time plane is generally referred to as an up-chirp, for example chirp 1 and chirp 2 on FIG. 1. A chirp having a negative gradient in the frequency-time plane is generally referred to as a down-chirp, for example chirp 3 on FIG. 1.

A chirp can be represented by a sequence of N samples. One or more identical contiguous chirps can form a symbol that represents a data value to be communicated. A chirp can be represented mathematically as:

$$C(g,p) = e^{j\pi g(n - fn(p))(n + 1 - fn(p))/N} \quad \text{(equation 1)}$$

where g is the gradient of the chirp, N is the number of samples in the sequence, n is a sample in the sequence, p is the symbol's value, fn(p) is a function that encodes p onto the received chirp, which implicitly may also be a function of g, n, N and other constants, and C is the received chirp sequence, which is normally evaluated for all integer values of n from 0 to N−1 in order. The number of valid values of p is the symbol set size, which is nominally N. However, the symbol set size can be more or less than N depending on the quality of the link. The value of g can have any value greater than 0 and less than N. Preferably, g is an integer between 1 and N−1. Due to the modular nature of this expression negative gradients are obtained from N−1 backwards. Hence, N−2 is equivalent to a negative gradient of −2. Where there are more than one identical contiguous chirps in a symbol, each chirp individually conveys the same value which is the symbol value of the symbol.

Figure 1:
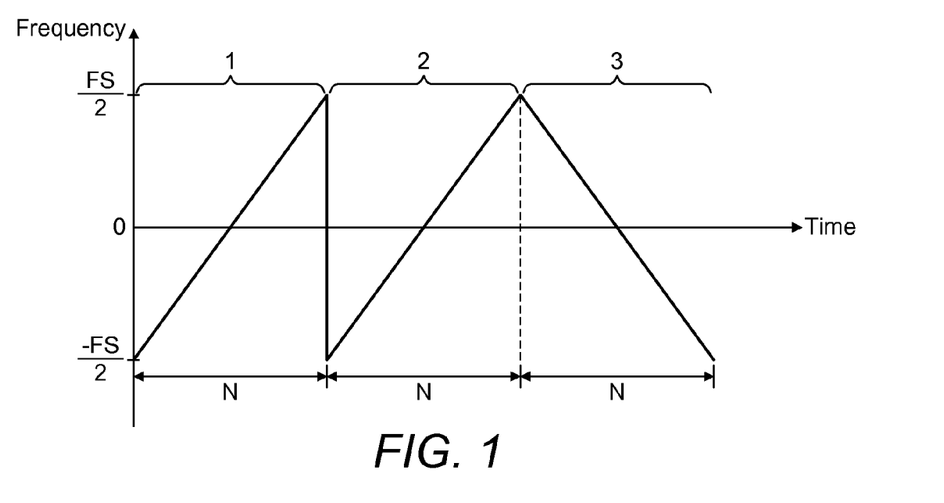
FIG. 1 illustrates a sequence of chirps in the frequency-time plane.

Chirp 1 in FIG. 1 has a starting frequency of −Fs/2 and a gradient of 1. It increases linearly in frequency over a period of N samples at a sample rate of Fs to reach a frequency close to +Fs/2. Since this is a complex sampled system +Fs/2 is the same as −Fs/2. Multiple chirps are usually contiguous but may start with a different frequency. The signal phase is typically made continuous throughout a sequence of chirps. In other words, after the signal has reached +Fs/2 at n=N−1, the next symbol starts with n=0 again. FIG. 1 illustrates an example in which two consecutive chirps have the same symbol value, whereas the third chirp is different. An apparent discontinuity in frequency between chirp 1 and chirp 2 occurs at n=N.

Figure 2:
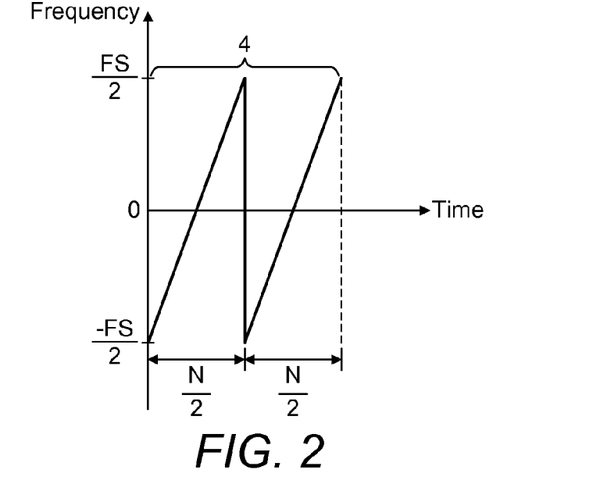
FIG. 2 illustrates a chirp having a gradient of 2 in the frequency-time plane.

Chirp 4 in FIG. 2 has a gradient of 2 and a starting frequency of −Fs/2. Because it has double the gradient of the chirps of FIG. 1, it increases linearly in frequency to +Fs/2 in half the number of samples that the chirps in FIG. 1 do, i.e. it reaches close to +Fs/2 after close to N/2 samples. The chirp then wraps around in frequency. Since this is a sampled system, these frequency wraps are in effect continuous and have continuous phase. The chirp repeats the frequency sweep from −Fs/2 to +Fs/2 between samples N/2 and N.

The chirps also have continuous frequency and phase from one end of the chirp to the other. A cyclic shift of the samples that make up a chirp creates another valid chirp.

In typical communication systems where privacy is required on a link between devices, communications on that link are encrypted. Generally this involves establishing a basic public connection, and then exchanging security keys (for example using the D-H key exchange algorithm). An XOR operation is performed with the data to be communicated and the security key to generate the encrypted signal. On receipt of this encrypted signal, the receiver performs an XOR operation with the encrypted signal and the security key in order to decrypt the data. Typically, security keys are exchanged for every message to be transmitted privately. Typically, the encrypted message bits that are transmitted can easily be received by a third party. However, in the absence of the key the third party will find it hard to decrypt the message.

This encryption method is suitable for systems utilising high data rates, and operating on devices having large energy reserves. However, chirp communications are typically used in systems operating using low data rates and short messages. The exchange of security keys for every message to be sent would cause significant delay when operating using low data rate chirp signals. Additionally, chirp signals are typically communicated between low power devices, for example battery powered handheld devices. The processing power required to communicate using the encryption process described above would be a significant drain of power for a low power device.

In alternative encrypted communication systems that use low power and short messages, the key exchange may be performed infrequently or only once, but otherwise operates as previously described. Typically, this is achieved by bringing the two devices into close proximity so that the keys can be exchanged securely. Alternatively, the D-H algorithm is used as previously described, but used less often. In particular, with a broadcast system, the keys cannot be modified after every message as there is no feedback to guarantee that both transmitter and receiver have the same key. Typically, the key must remain fixed or is a function of the public part of a message. A disadvantage of this approach is that a third party listening to the communication would still be able to read the bits of the communication and over time guess the security key, either directly or via the public part of a message. For example, if one knew that the transmitted data were speech, then with enough time, one could try decoding a message with all possible keys until something resembling speech resulted. This process is made easier if all messages share the same key. This process can be automated and has been shown to break some encryption methods.

Thus, there is a need for an improved method of encrypting chirp communications which is less power intensive than traditional encryption methods, and where the encrypted data bits themselves cannot easily be read, and is suitable for systems operating using low data rates and short messages.

SUMMARY OF THE INVENTION

According to a first aspect, there is provided a method of securely communicating a data chirp signal from a transmitter to a receiver, the chirp signal comprising at least one symbol, each symbol comprising one or more identical chirps, each chirp encoding a symbol value, the method comprising: negotiating between the transmitter and the receiver encryption parameters of the chirp signal, the encryption parameters defining at least one property of each symbol of the chirp signal; at the transmitter, encrypting the chirp signal as negotiated; at the transmitter, encoding data in the chirp signal via the symbol value of each chirp; and transmitting the encrypted and encoded chirp signal from the transmitter to the receiver.

Suitably, the encryption parameters are negotiated such that the at least one property of each symbol of the chirp signal is different for contiguous symbols in the chirp signal.

Suitably, the at least one property of each symbol includes the gradient of the symbol.

Suitably, the at least one property of each symbol includes the centre frequency of the symbol.

Suitably, the at least one property of each symbol includes the value of N.

Suitably, the at least one property of each symbol includes the bandwidth of the symbol.

Suitably, the at least one property of each symbol includes the number of identical chirps in the symbol.

Suitably, the method further comprises re-negotiating encryption parameters periodically such that further data chirp signals are encrypted with re-negotiated encryption parameters that are different to the encryption parameters of the data chirp signal.

Suitably, the method further comprises: setting the physical separation of the transmitter and the receiver to be sufficiently small as to enable use of a low power communication between the transmitter and the receiver; and performing the negotiation step using the low power communication.

Suitably, the method further comprises, following the negotiation step, increasing the physical separation of the transmitter and the receiver; and performing the transmitting step at the increased physical separation.

Suitably, each chirp is represented by a sequence of N samples, the N samples being cyclically shiftable such that the symbol value of the chirp is defined by the cyclic phase of the N samples.

Suitably, the symbol value of a chirp is defined by the equation:

$$C(g,p) = e^{j\pi g(n - fn(p))(n + 1 - fn(p))/N}$$

where C is the chirp sequence, g is the gradient of the chirp, n is a sample in the chirp sequence, p is the symbol value, and N is the number of samples in the sequence.

According to a second aspect, there is provided a transmitter configured to securely communicate a data chirp signal to a receiver, the chirp signal comprising at least one symbol, each symbol comprising one or more identical chirps, each chirp encoding a symbol value, the transmitter comprising: a processor configured to negotiate with the receiver encryption parameters of the chirp signal, the encryption parameters defining at least one property of each symbol of the chirp signal; an encryption module configured to encrypt the chirp signal as negotiated; an encoding module configured to encode data in the chirp signal via the symbol value of each chirp; and a transmitting module configured to transmit the encrypted and encoded chirp signal from the transmitter to the receiver.

Suitably, the processor is configured to negotiate the encryption parameters such that the at least one property of each symbol of the chirp signal is different for contiguous symbols in the chirp signal.

Suitably, the processor is further configured to re-negotiate encryption parameters periodically such that further data chirp signals are encrypted with re-negotiated encryption parameters that are different to the encryption parameters of the data chirp signal.

Suitably, the processor is further configured to perform the negotiation using a low power communication.

According to a third aspect, there is provided receiver configured to securely receive a data chirp signal from a transmitter, the chirp signal comprising at least one symbol, each symbol comprising one or more identical chirps, each chirp encoding a symbol value, the receiver comprising: a processor configured to negotiate with the transmitter encryption parameters of the chirp signal, the encryption parameters defining at least one property of each symbol of the chirp signal; a receiving module configured to receive an encrypted and encoded chirp signal from the transmitter; a decrypting module configured to decrypt the chirp signal as negotiated; and a decoding module configured to decode data in the chirp signal via the symbol value of each chirp.

Suitably, the processor is configured to negotiate the encryption parameters such that the at least one property of each symbol of the chirp signal is different for contiguous symbols in the chirp signal.

Suitably, the processor is further configured to re-negotiate encryption parameters periodically such that further data chirp signals are encrypted with re-negotiated encryption parameters that are different to the encryption parameters of the data chirp signal.

Suitably, the processor is further configured to perform the negotiation using a low power communication.

BRIEF DESCRIPTION OF THE DRAWINGS

The following disclosure will now be described by way of example with reference to the accompanying drawings. In the drawings.

DETAILED DESCRIPTION

The following disclosure is directed at an encryption method for use in chirp communications to securely communicate a data chirp signal between a transmitter and a receiver. Encryption parameters of the chirp signal to be securely communicated are negotiated between the transmitter and receiver prior to transmission of the chirp signal. These encryption parameters define a particular property or properties of each symbol in the chirp signal, for example the gradient of each symbol in the chirp signal. The transmitter transmits the chirp signal having the negotiated parameters and also encoding the data to be securely transmitted. The receiver is configured to receive a signal having the negotiated parameters. This process will be described further in the examples that follow.

As previously described, a chirp in the chirp signal can be represented by a sequence of N samples. One or more identical contiguous chirps can form a symbol that represents a data value to be communicated. Mathematically, a chirp signal can be represented as:

$$C(g,p) = e^{j\pi g(n-fn(p))(n+1-fn(p))/N} \quad \text{(equation 1)}$$

where g is the gradient of the chirp, N is the number of samples in the sequence, n is a sample in the sequence, p is the symbol's value, fn(p) is a function that encodes p onto the received chirp, which implicitly may also be a function of g, n, N and other constants, and C is the received chirp sequence, which is normally evaluated for all integer values of n from 0 to N−1 in order. The number of valid values of p is the symbol set size, which is nominally N. However, the symbol set size can be more or less than N depending on the quality of the link. The value of g can have any value greater than 0 and less than N. Preferably, g is an integer between 1 and N−1. Due to the modular nature of this expression negative gradients are obtained from N−1 backwards. Hence, N−2 is equivalent to a negative gradient of −2. Where there are more than one identical contiguous chirps in a symbol, each chirp individually conveys the same value which is the symbol value of the symbol.

Chirps have several properties which are configurable by a transmitter. One such property is the symbol value p. The N samples of a chirp are cyclically shiftable. For example, the particular cyclically shifted position of the samples in a chirp relative to a default position can be used to define the symbol value. In other words the cyclic phase of the N samples of a chirp can be related to the symbol value. There are N different cyclic phases of a chirp, and hence, in this example, there are N different possible symbol values. Suitably, the symbol value p is used to convey data. The amount of data that is conveyed by the symbol value of one symbol depends on the value of N. For example, if N is 257 then there are 257 different possible symbol values. Consequently, the detected symbol value could be used to convey approximately 8 bits of data. For example, if p is 10 then this could be interpreted as the 8 bits 00001010. Similarly, if p is 40 then this could be interpreted as the 8 bits 00101000. Further bits can be encoded by whether the chirp is an up-chirp or a down-chirp.

Figure 3:
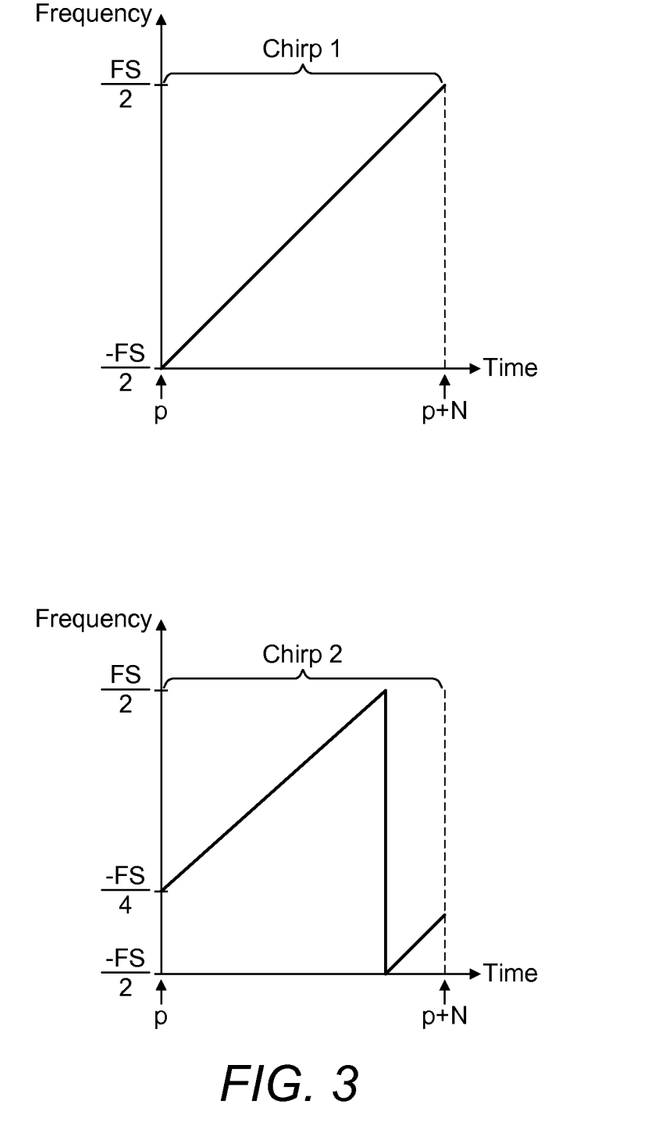
FIG. 3 illustrates encoding data via the starting frequency of a chirp.

Suitably, the symbol value is controlled by controlling the starting frequency of each chirp in the symbol. Alternatively, this is achieved by evaluating equation 1 using the selected p values. FIG. 3 illustrates the concept of using the symbol value p to convey data by showing two chirps both having unity gradient. Chirp 1 has a starting frequency of −Fs/2. The symbol value p of chirp 1 is such that the chirp increases in frequency to +Fs/2 over N samples. Chirp 2 has a starting frequency of −Fs/4. The symbol value p of chirp 2 is such that the chirp increases in frequency to +Fs/2 in less than N samples and then drops down to −Fs/2 and returns to −Fs/4 after N samples. Suitably, the chirp receiver detects the symbol value of each chirp in the chirp signal in order to decode the data in the chirp signal.

Other properties of chirps which are configurable by a transmitter are: the gradient of each chirp, the centre frequency of each chirp, the number of samples N in the chirp, the bandwidth of the chirp, and the number of times a chirp is repeated in a symbol. Suitably, in the encryption method described herein one or more of these properties are negotiated between the transmitter and the receiver in advance of the transmission of the encrypted chirp signal. Typically, there are a different set of properties for each symbol in the chirp signal. If any of the properties described is not known then the encrypted symbol value may not be accurately read.

For example, if a third party receiver were receiving on the wrong RF frequency no valid signal would be received. If the frequency were correct but the gradient or sample rate or N or the number of chirps in a symbol were incorrect then it is unlikely that the correlator would detect a symbol at all, and even less likely that the encrypted symbol value would be correct. A third party attempting to listen into the communication would not know the negotiated properties of the chirp signal which consequently means it will not be able to read the encrypted data bits. Since the third party is unable to read the encrypted bits, it would be unable to decrypt them, whatever processing power it has available. Hence, even if the encryption process itself is not very secure, for example due to using only a single or infrequent exchange of keys, a third party would find it very hard to read and then decrypt the message.

Figure 4:
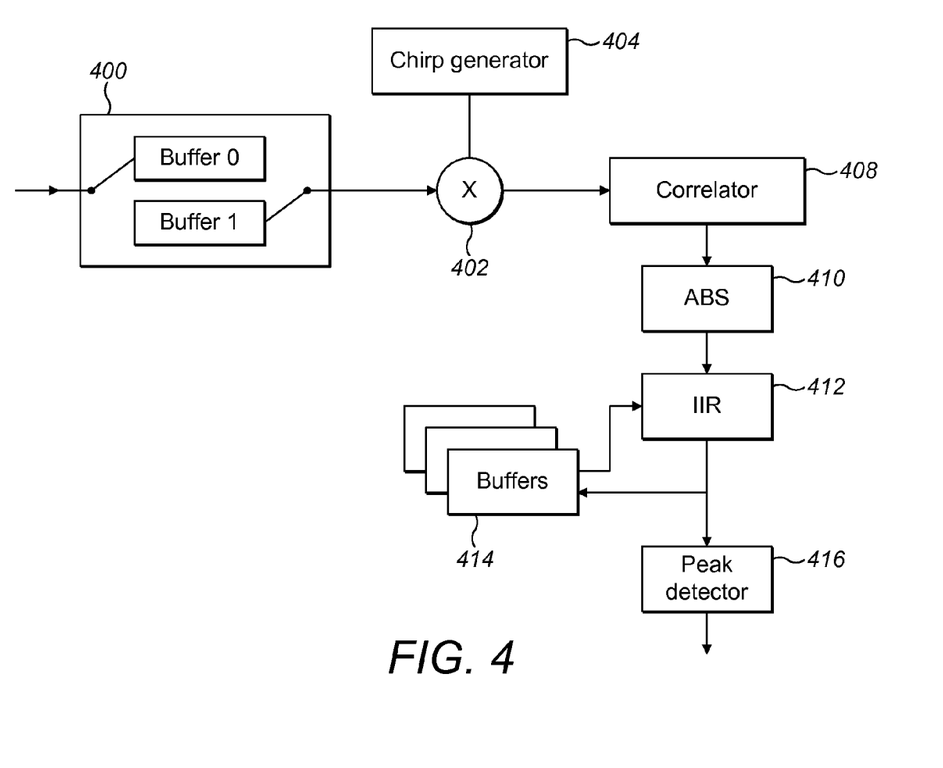
FIG. 4 illustrates a schematic diagram of the exemplary components of a chirp receiver.

Reference is now made to FIG. 4 which is a schematic diagram of the exemplary components of a chirp receiver.

A chirp signal is received at the chirp receiver and the samples of a received chirp of the chirp signal are input to buffer module 400. Suitably, buffer module 400 comprises two buffers. This enables an input buffer to be receiving samples whilst the output buffer is being read. When the input buffer becomes full the two buffers are swapped over so that input samples can continue to be sampled and stored without loss. If one of a set of chirp gradients are expected, for example when decoding additional symbol bits by using $2^K$ gradients to represent K bits of additional information, or when wanting to communicate with one of a number of devices with different predefined gradients, then the output buffer may be read multiple times, once for each possible gradient. With suitably fast digital processing clock rates these buffers can provide a means to decode and track received chirps in real time. The received chirp samples output from the buffer module 400 are input to chirp multiplier 402.

Chirp generator 404 generates a reference chirp which has a gradient g' which differs from the gradient g of the chirp output from the buffer module 400 by a fixed value v. Preferably, this fixed value is 1. Preferably, g−g'=1. Preferably, the reference chirp has the same number of samples in a chirp N, sample rate (bandwidth) and centre frequency as the chirp output from the buffer module 400. Suitably, the receiver operates according to a protocol in which the gradient, the sample rate, the number of repeats of a chirp in a symbol, the number of samples N in a chirp, and the frequency hopping sequence of each symbol in the chirp signal are known by the receiver in advance of receiving the chirp signal. These properties may be defined by the protocol. In a public broadcast system these properties may be publicly known. Alternatively, one or more of these properties may be negotiated between the transmitter and the receiver in advance of communication of the chirp signal.

Suitably, the chirp multiplier 402 multiplies the received chirp with the conjugate of the reference chirp generated by chirp generator 404. The mixed chirp output from the chirp multiplier 802 is input to correlator 408.

Figure 5:
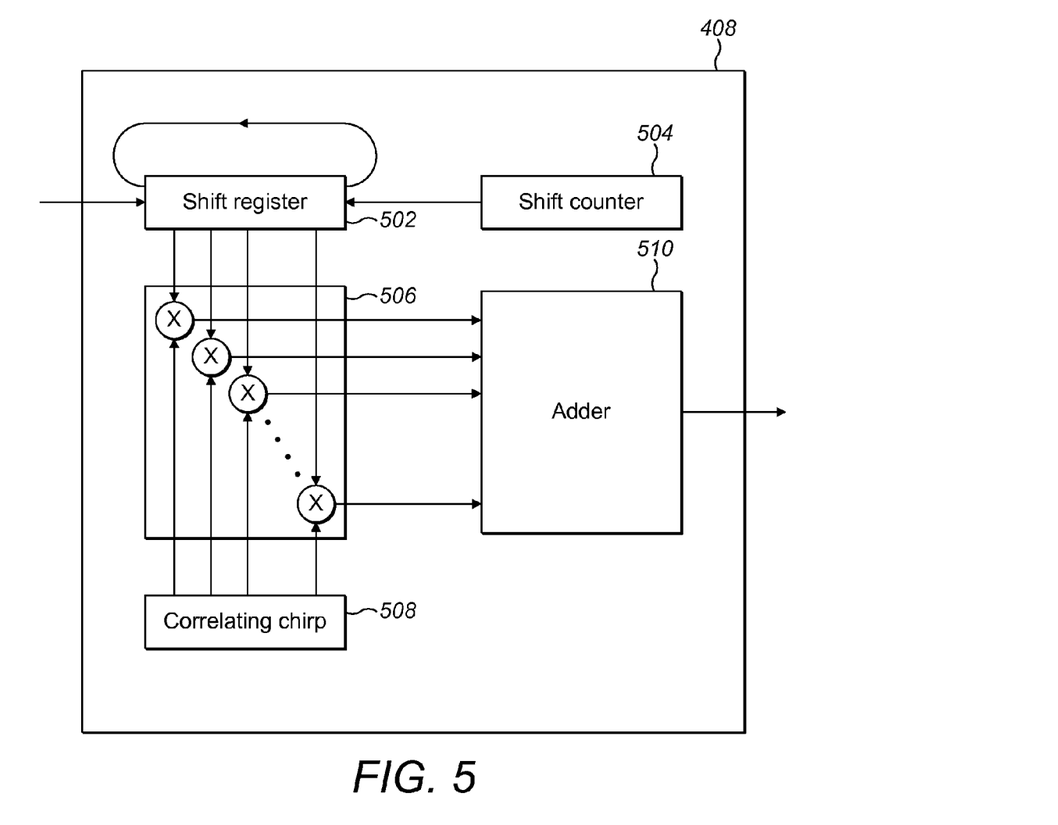
FIG. 5 illustrates a schematic diagram of a chirp correlator.

The correlator 408 correlates the mixed chirp with a conjugate of the fixed correlating chirp. The fixed correlating chirp has a gradient which is equal to the fixed value v. Preferably, the fixed correlating chirp has unity gradient. FIG. 5 illustrates a more detailed diagram of an exemplary correlator 408. The N samples of the mixed chirp signal output from chirp multiplier 404 are first loaded into N-stage circular shift register 502. The fixed gradient correlating chirp signal consists of one chirp of N samples which are preloaded into correlating chirp module 508. The shift counter 504 is preloaded with the number of shifts, and hence the number of outputs of correlator 408. During normal operation shift counter 504 is preloaded with N, but when using reduced symbol alphabets or if N is non-prime then shift counter 504 could be less than N. The correlator 408 comprises N complex multipliers 506, each taking a complex input from the N-stage circular shift register 502 samples, and the corresponding complex input from the correlating chirp module 508. The output from the N complex multipliers is then summed at adder 510 to yield a single complex correlator sample that is output from the correlator 408. For each successive correlation, the N-stage circular shift register 502 rotates by one. If the sample at the beginning of the N-stage circular shift register is s for one correlation, then the sample at the beginning of the N-stage circular register is s−1 for the next correlation. In this way, the correlator performs a correlation between the fixed gradient correlating chirp and N cyclic phases of the mixed chirp, generating N outputs. When the received chirp, the reference chirp and fixed correlating chirp have gradients such that $g-g' \neq v$, then the correlator outputs small values for all cyclic phases. This is the case when the chirp receiver is not configured to correctly receive the chirp signal. When the received chirp, the reference chirp and fixed correlating chirp have gradients such that $g-g'=v$, the correlator outputs a strong correlation peak when the cyclic phase of the mixed chirp matches that of the fixed gradient correlating chirp and smaller values in other positions. In this way, the position of the correlation peak identifies the symbol value of the chirp. The data encoded in the chirp is then determined from the symbol value of the chirp.

Suitably, the output of the correlator 408 is input to an absolute value module 410. The absolute value module returns the magnitude of the complex input signal from the correlator 408. Suitably, the output of absolute value module 810 is input to an integrator 412. In some transmitter receiver configurations the received chirp signal comprises a set of individual chirps which are all identical, i.e. they have the same gradient and symbol value. The integrator is configured to integrate the corresponding correlator outputs of each of the individual chirps. So, for example, the integrator integrates the correlator output of each individual chirp for the case when the N-stage circular shift register is in the position s=1. Similarly, the integrator integrates the correlator output of each individual chirp for the case when the N-stage circular shift register is in the position s=2, and so on. The integrator performs the integration by storing the N samples of the correlator output for a specific s position of the first chirp in the set in the buffers 414. It then retrieves these stored N samples from buffers 414 and performs an average of them with the N samples of the corresponding correlator output of the second chirp in the set. It then stores this averaged output in the buffers 414. It then retrieves these stored N samples from buffers 414 and performs an average of them with the N samples of the corresponding correlator output from the third chirp in the set. The iteration continues until all the chirps in the chirp set have been integrated. This integration technique is non-coherent integration. In one approach all the samples from repeated chirps are stored in memory, before an average is performed. Alternatively, if memory is limited the integrator might perform the average using N IIR (infinite impulse response) filters, with coefficients suitably chosen for the expected number of identical chirps in a symbol.

In an alternative implementation, the receiver device of FIG. 4 may be modified such that the absolute value module 410 is after the integrator 412. In this case the integrator 412 is a complex integrator. In this case the integration technique is coherent integration.

For the case where the frequency drift between transmitter and receiver is sufficiently small, this integrated output results in more accurate correlation peak detection, which is performed in peak detection module 416.

The receiver operates according to a protocol in which the gradient, the sample rate, the number of repeats of a chirp in a symbol, the number of samples N in a chirp, and the centre frequency of each symbol in the chirp signal are known by the receiver in advance of receiving the chirp signal. This enables the receiver to generate the correct reference chirp, and to correctly correlate the mixed chirp with the fixed gradient correlating chirp. If the receiver generates the wrong reference chirp, for example one with the wrong gradient, then the correlator output does not have correlation peaks which enable the receiver to determine the data encoded in the chirp signal.

Figure 6:
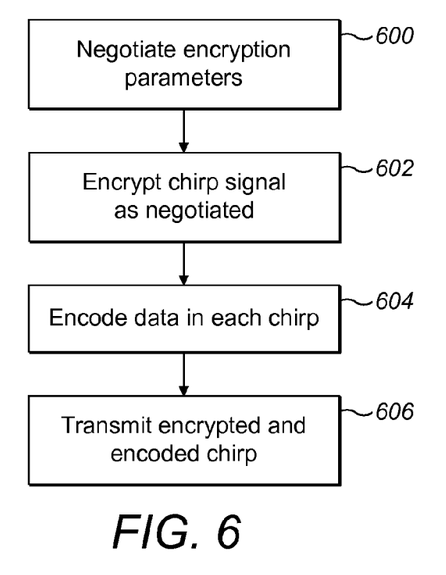
FIG. 6 is a flow chart illustrating a method of securely communicating a data chirp.

FIG. 6 illustrates a method of securely communicating a data chirp signal. At step 600, the transmitter and receiver negotiate encryption parameters of the chirp signal to be securely communicated between the transmitter and the receiver. These encryption parameters define at least one property of each symbol of the chirp signal. Suitably, the encryption parameters define at least one of the following properties of each symbol: the gradient of the chirp, the centre frequency of the chirp, the number of samples in the chirp N, the bandwidth of the chirp, and the number of times the chirp is repeated in each symbol. Suitably, the chirp gradient is selected to be greater than zero and less than N. Suitably, the centre frequency of the chirp is any frequency within the permissible RF transmit frequency range. For example, this could be any of the worldwide ISM frequency bands. As a further example, this could be any of the worldwide White Space frequency bands. Defining a chirp bandwidth inherently defines the chirp sample rate.

The encryption parameters may define any combination of the listed properties. Each transmitted symbol may be encoded using a separate set of properties. Practically, it may be desirable to transmit several contiguous symbols using the same centre frequency, but vary the other parameters. The more properties that are defined in the encryption parameters, the more unlikely it is that a third party will successfully receive and decrypt the chirp signal. This is because a third party receiver of the form described in relation to FIG. 4 needs to correctly guess each of these properties for each symbol of the chirp signal in order that its correlator will generate correlation peaks which identify the data encoded in the chirp signal.

The encryption parameters may define the properties to be the same for each symbol in the chirp signal. However, preferably, the encryption parameters define the properties to be such that the property for one symbol is different to the property for the contiguous symbol in the chirp signal. Suitably, the property for one symbol is different to the property for the other symbols in the chirp signal. For example, the gradients of contiguous symbols in the chirp signal may be defined by the encryption parameters to be 6, 22, 31, 1, 42, 152, 221 . . . . This provides extra security to the secure chirp signal because even if a third party trying to listen into the communication were to guess the correct gradient of one symbol and be able to decode the data in that symbol, it would be in no better position to decode the next symbol because it would have to guess the gradient again.

At step 602, the transmitter encrypts the chirp signal according to the encryption parameters as negotiated between the transmitter and receiver. At step 604, the transmitter encodes data via the symbol value of each symbol of the chirp signal as previously described. Alternatively, equation 1 is evaluated in order to encrypt and encode data in the chirp signal. In this case steps 602 and 604 are carried out contemporaneously by evaluating equation 1. At step 606, the transmitter then transmits the encrypted and encoded chirp signal to the receiver.

Figure 7:
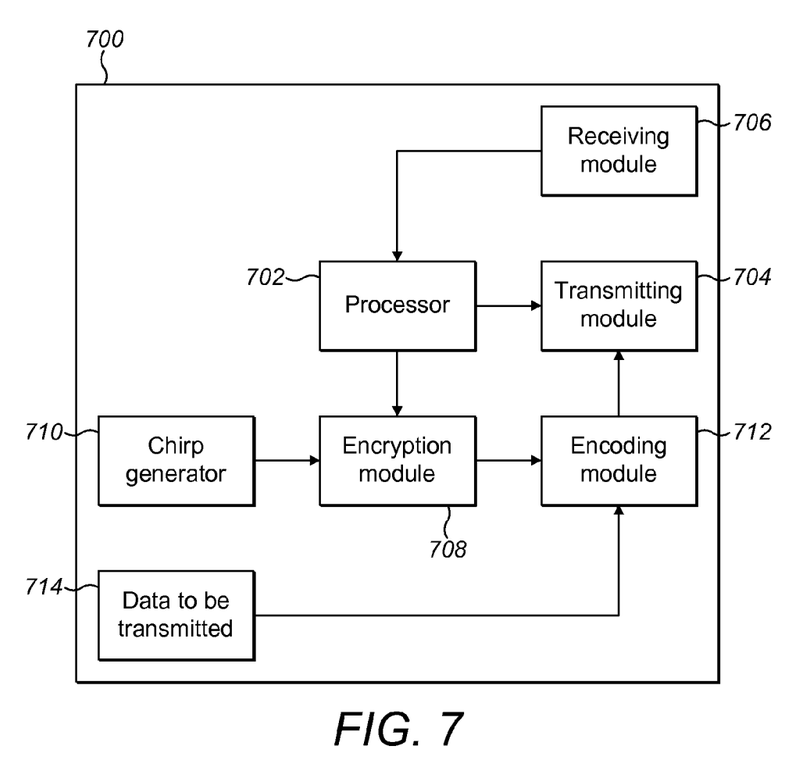
FIG. 7 illustrates a schematic diagram of the exemplary components of a chirp transmitter.

FIG. 7 illustrates a schematic diagram of an exemplary transmitter according to the methods described herein. Processor 702 of transmitter 700 is configured to perform the negotiating steps described. Suitably, the negotiating communications are transmitted to a receiver by transmitting module 704, and negotiating communications from a receiver are received by receiving module 706. Encryption module 708 is configured to encrypt chirps generated by chirp generator 710 as negotiated by processor 702. Encoding module 712 is configured to encode data to be transmitted 714 via the symbol values in the chirp signal. Transmitting module 704 then transmits the encrypted and encoded chirp signal to the receiver.

Figure 8:
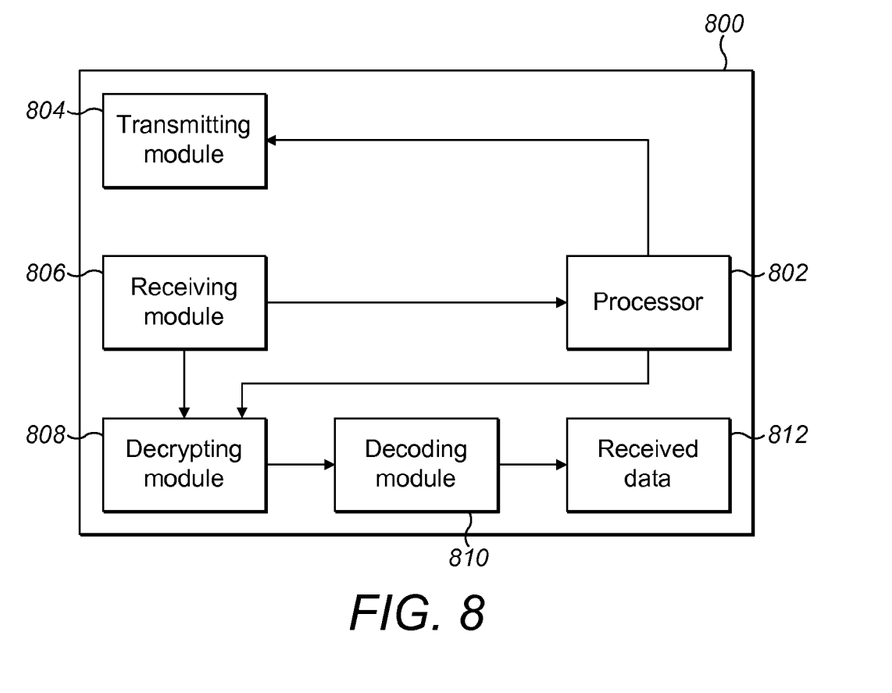
FIG. 8 illustrates a schematic diagram of the exemplary components of a chirp receiver.

FIG. 8 illustrates a schematic diagram of an exemplary receiver according to the methods described herein. Processor 802 of receiver 800 is configured to perform the negotiating steps described. Suitably, the negotiating communications are transmitted to a transmitter by transmitting module 804, and negotiating communications from a transmitter are received by receiving module 806. Suitably, receiving module 806 comprises a means to mix the received radio signal, from the negotiated centre frequency, down to the received chirp signal. Suitably, receiving module 806 also comprises module 400 of FIG. 4 into which the mixed down received chirp signal is input. Decrypting module 808 is configured to decrypt chirps as negotiated. Suitably, the decrypting module 808 comprises chirp generator 404 and chirp multiplier 402 of FIG. 4. Decoding module 810 is configured to decode data in the chirp signal via the symbol value of each chirp. Suitably, decoding module 810 comprises correlator 408, absolute value module 410, integrator 412 and 414 and peak detector 416 of FIG. 4. The receiver thereby determines the received data 812.

FIGS. 4, 5, 7 and 8 illustrate schematic diagrams showing exemplary components of receivers, a correlator and a transmitter according to the methods described herein. These figures illustrate the layout of these devices in terms of functional boxes. The operations of one or more of these functional boxes may be combined or performed by separate components. For example, suitably in the transmitter, the operations of the encryption module, encoding module and chirp generator are performed in combination by the chirp generator. In this example, the data to be transmitted and one or more of the encryption parameters are inputs to the chirp generator. The chirp generator then generates a data encoded chirp in accordance with those encryption parameters. Suitably, the transmitting module receives the generated chirp and the centre frequency of the chirp, which it mixes prior to transmitting the mixed output to a receiver. It will be understood that these figures do not illustrate those conventional components of these devices known to a person skilled in the art.

Suitably, the transmitter and receiver re-negotiate the encryption parameters periodically. For example, the encryption parameters are suitably re-negotiated for each data chirp signal to be securely communicated. The re-negotiated encryption parameters for a second data chirp signal to be securely communicated are different to the encryption parameters for the first data chirp signal to be securely communicated. For example, the transmitter and receiver may initially negotiate a plurality of sets of encryption parameters. Alternatively, the transmitter and receiver may agree on an algorithm for generating multiple sets of encryption parameters based on a password. A first set of encryption parameters is then used for encrypting the first data chirp signal. The transmitter may then re-negotiate the encryption parameters by asserting a "next parameter set" bit in the signal to the receiver, which the receiver acknowledges to the transmitter. Following this re-negotiation, the transmitter and receiver use a second set of encryption parameters to encrypt a second data chirp signal. In situations where maintaining low power is more important than providing secure communications, the same encryption parameters may be utilised for successive data chirp signal transmissions from the transmitter to the receiver.

In a specific example, the data chirp signal to be securely communicated comprises chirps, wherein each chirp is described by a Zadoff-Chu code. Suitably, contiguous chirp symbols have different Zadoff-Chu codes. Suitably, contiguous chirp symbols also have different centre frequencies. Suitably, the negotiated encryption parameters define the Zadoff-Chu codes sequence of the chirp signal. Suitably, the negotiated encryption parameters also define the frequency hopping sequence of the chirp signal. Using different Zadoff-Chu codes for each symbol provides a degree of coded separation, allowing more than one user to use the frequency spectrum at the same time.

In a further example applicable particularly to low power platforms, the physical separation of the transmitter and the receiver may be maintained sufficiently small during the negotiating step of the method that a low power link between the transmitter and receiver can be used. Use of a low power link for the negotiation between the transmitter and receiver reduces the likelihood of third party devices being able to successfully eavesdrop into the negotiation because the third party devices are likely to be too far away from the transmitter and receiver to pick up the low power negotiation signals. Suitably, the transmitter and receiver are physically connected, for example via a cable, for the negotiation step. Following the negotiation step, the physical separation of the transmitter and receiver may be increased. A higher power link may then be used for the secure communication of the data chirp signal.

The encryption method described herein is a lower power method than the described prior art method. The encryption is contained within the properties of the chirps in the chirp signal, and the data is also encoded using a different property of the chirps in the chirp signal. In contrast, the prior art method described in which a XOR operation between the data to be communicated and a security key is performed requires more processing power. Additionally, in the described prior art method, a third party is able to receive the encrypted signal even if it is not able to decode it. Whereas, in the method described herein, the third party is not able to even receive the encrypted signal unless it knows the encryption parameters. For example, in the example above in which each symbol in the chirp signal has a different gradient and is transmitted at a different frequency, the third party device will only receive each symbol of the chirp signal if it correctly guesses the gradient and frequency of that symbol. If the third party device guesses the wrong gradient or frequency then the correlator of the third party device will not detect the chirp. The correlator output would look similar to a received signal that comprised only noise at the same power level as the received signal. It would have no discernible peaks. For those skilled in the art, it will be apparent that changing the chirp bandwidth, the length of the chirp or the number chirps in a symbol would adversely affect the ability of a third party correlator to decode a correct symbol value. Hence, additional security is achieved by selecting the chirp bandwidth, the length of the chirp or the number chirps in a symbol in addition to the gradient and centre frequency. In order to detect the chirp signal, the third party device would need to log the whole possible RF spectrum to work out the frequency hopping sequence, and then correlate the signal against all gradients in all sample phases. It would also have to guess the chirp lengths and estimate the bandwidths of each chirp. If any other transmitters were to be operating at the same time then the third party device would need to distinguish between the signals transmitted from the different devices. If the encrypted parameters are changed periodically then it is extremely difficult for a third party device to detect and decode the chirp signal.

Conventional encryption methods are already known as previously described. Suitably, data encrypted using a conventional method is further encrypted, transmitted, received and decrypted using the methods described herein. Following this process yields the same encrypted data of the conventional method. As previously described, a conventional encryption key may be applied. For example, the D-H key exchange algorithm previously described may be applied.

Suitably, the receiver and transmitter described herein are implemented in a system operating according to Bluetooth protocols.

Preferably, the receiver and transmitter described herein are implemented in hardware. Alternatively, the receiver and transmitter described herein may be implemented in software.

Suitably, the receiver and transmitter described herein are implemented in long range radio communications. Typically, chirps are used for implementations that use a low data rate and low power. The receiver and transmitter are suitable for use in high-sensitivity radio communications. Example implementations of the receiver and transmitter are in a temperature sensor, a walkie talkie or a wireless headset.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method of securely communicating a data chirp signal from a transmitter to a receiver, the chirp signal comprising at least one symbol, each symbol comprising one or more identical chirps, each chirp encoding a symbol value, the method comprising:
   negotiating between the transmitter and the receiver encryption parameters of the chirp signal, the encryption parameters defining at least one property of each symbol of the chirp signal;
   at the transmitter, encrypting the chirp signal according to the encryption parameters by generating each symbol of the chirp signal using the at least one property defined by the negotiated encryption parameters;
   at the transmitter, encoding data in the chirp signal via the symbol value of each chirp; and
   transmitting the encrypted and encoded chirp signal from the transmitter to the receiver.

2. A method as claimed in claim 1, wherein the encryption parameters are negotiated such that the at least one property of each symbol of the chirp signal is different for contiguous symbols in the chirp signal.

3. A method as claimed in claim 1, wherein the at least one property of each symbol includes the gradient of the symbol.

4. A method as claimed in claim 1, wherein the at least one property of each symbol includes the centre frequency of the symbol.

5. A method as claimed in claim 1, wherein the at least one property of each symbol includes a value of N, wherein N is a number of samples in each symbol.

6. A method of securely communicating a data chirp signal from a transmitter to a receiver, the chirp signal comprising at least one symbol, each symbol comprising one or more identical chirps, each chirp encoding a symbol value, the method comprising:
   negotiating between the transmitter and the receiver encryption parameters of the chirp signal, the encryption parameters defining at least one property of each symbol of the chirp signal;
   at the transmitter, encrypting the chirp signal as negotiated;
   at the transmitter, encoding data in the chirp signal via the symbol value of each chirp;
   transmitting the encrypted and encoded chirp signal from the transmitter to the receiver and
   re-negotiating encryption parameters periodically such that further data chirp signals are encrypted with re-negotiated encryption parameters that are different to the encryption parameters of the data chirp signal.

7. A transmitter configured to securely communicate a data chirp signal to a receiver, the chirp signal comprising at least one symbol, each symbol comprising one or more identical chirps, each chirp encoding a symbol value, the transmitter comprising:
   a processor configured to negotiate with the receiver encryption parameters of the chirp signal, the encryption parameters defining at least one property of each symbol of the chirp signal;
   an encryption module configured to encrypt the chirp signal according to the encryption parameters by generating each symbol of the chirp signal using the at least one property defined by the negotiated encryption parameters;
   an encoding module configured to encode data in the chirp signal via the symbol value of each chirp; and
   a transmitting module configured to transmit the encrypted and encoded chirp signal from the transmitter to the receiver.

8. A transmitter as claimed in claim 7, wherein the processor is configured to negotiate the encryption parameters such that the at least one property of each symbol of the chirp signal is different for contiguous symbols in the chirp signal.

9. A transmitter as claimed in claim 7, wherein the at least one property of each symbol includes the gradient of the symbol.

10. A transmitter as claimed in claim 7, wherein the at least one property of each symbol includes the centre frequency of the symbol.

11. A transmitter as claimed in claim 7, wherein the at least one property of each symbol includes a value of N, wherein N is a number of samples in each symbol.

12. A transmitter as claimed in claim 7, wherein the at least one property of each symbol includes the bandwidth of the symbol.

13. A transmitter configured to securely communicate a data chirp signal to a receiver, the chirp signal comprising at least one symbol, each symbol comprising one or more identical chirps, each chirp encoding a symbol value, the transmitter comprising:

a processor configured to negotiate with the receiver encryption parameters of the chirp signal, the encryption parameters defining at least one property of each symbol of the chirp signal;

an encryption module configured to encrypt the chirp signal as negotiated;

an encoding module configured to encode data in the chirp signal via the symbol value of each chirp; and a transmitting module configured to transmit the encrypted and encoded chirp signal from the transmitter to the receiver; and wherein the processor is further configured to-renegotiate encryption parameters periodically such that further data chirp signals are encrypted with re-negotiated encryption parameters that are different to the encryption parameters of the data chirp signal.

14. A receiver configured to securely receive a data chirp signal from a transmitter, the chirp signal comprising at least one symbol, each symbol comprising one or more identical chirps, each chirp encoding a symbol value, the receiver comprising:

a processor configured to negotiate with the transmitter encryption parameters of the chirp signal, the encryption parameters defining at least one property of each symbol of the chirp signal;

a receiving module configured to receive an encrypted and encoded chirp signal from the transmitter, wherein each symbol of the encrypted and encoded chirp signal was generated using the at least one property defined by the negotiated encryption parameters;

a decrypting module configured to decrypt each symbol of the chirp signal using the at least one property defined by the negotiated encryption parameters; and a decoding module configured to decode data in the chirp signal via the symbol value of each chirp.

15. A receiver as claimed in claim 14, wherein the processor is configured to negotiate the encryption parameters such that the at least one property of each symbol of the chirp signal is different for contiguous symbols in the chirp signal.

16. A receiver as claimed in claim 14, wherein the at least one property of each symbol includes the gradient of the symbol.

17. A receiver as claimed in claim 14, wherein the at least one property of each symbol includes the centre frequency of the symbol.

18. A receiver as claimed in claim 14, wherein the at least one property of each symbol includes a value of N, wherein N is a number of samples in each symbol.

19. A receiver as claimed in claim 14, wherein the at least one property of each symbol includes the bandwidth of the symbol.

20. A receiver configured to securely receive a data chirp signal from a transmitter, the chirp signal comprising at least one symbol, each symbol comprising one or more identical chirps, each chirp encoding a symbol value, the receiver comprising:

a processor configured to negotiate with the transmitter encryption parameters of the chirp signal, the encryption parameters defining at least one property of each symbol of the chirp signal;

a receiving module configured to receive an encrypted and encoded chirp signal from the transmitter;

a decrypting module configured to decrypt the chirp signal as negotiated; and a decoding module configured to decode data in the chirp signal via the symbol value of each chirp, wherein the processor is further configured to renegotiate encryption parameters periodically such that further data chirp signals are encrypted with re-negotiated encryption parameters that are different to the encryption parameters of the data chirp signal.

\* \* \* \* \*